(12) United States Patent
Dubinsky et al.

(10) Patent No.: US 8,656,149 B2
(45) Date of Patent: Feb. 18, 2014

(54) RAPID ACTIVATION OF SERVICE MANAGEMENT PROCESSOR SUBSYSTEM FOR SERVER DEVICE

(75) Inventors: Dean V. Dubinsky, Kirkland, WA (US); Karen A. Taylor, Kirkland, WA (US)

(73) Assignee: International Business Machies Corporation, Armonk, NY (US)

( * ) Notice: Subject to any disclaimer, the term of this patent is extended or adjusted under 35 U.S.C. 154(b) by 422 days.

(21) Appl. No.: 12/795,369

(22) Filed: Jun. 7, 2010

(65) Prior Publication Data

US 2011/0302399 A1 Dec. 8, 2011

(51) Int. Cl.
*G06F 15/177* (2006.01)

(52) U.S. Cl.
USPC .......................................................... 713/2

(58) Field of Classification Search
USPC .......................................................... 713/2
See application file for complete search history.

(56) References Cited

U.S. PATENT DOCUMENTS

| | | | |
|---|---|---|---|
| 6,438,668 B1 * | 8/2002 | Esfahani et al. | 711/165 |
| 6,721,885 B1 * | 4/2004 | Freeman et al. | 713/2 |
| 6,944,867 B2 * | 9/2005 | Cheston et al. | 719/327 |
| 7,017,052 B2 * | 3/2006 | Aklilu et al. | 713/300 |
| 7,313,684 B2 * | 12/2007 | O'Connell | 713/2 |
| 7,340,593 B2 | 3/2008 | Martin | |
| 7,409,537 B2 | 8/2008 | Tsang | |
| 7,444,341 B2 | 10/2008 | Riedle | |
| 7,900,074 B2 * | 3/2011 | Reece et al. | 713/323 |
| 2003/0233534 A1 | 12/2003 | Bernhard et al. | |
| 2008/0256295 A1 | 10/2008 | Lambert et al. | |

* cited by examiner

*Primary Examiner* — Kim Huynh
*Assistant Examiner* — Eric Chang
(74) *Attorney, Agent, or Firm* — Thomas Tyson

(57) ABSTRACT

A bootloader process executing on a service management processor (SMP) subsystem for a server device determines whether flag stored within non-volatile memory of the subsystem is set. The flag corresponds to whether a full cold initialization process of the subsystem is to occur. In response to determining that the flag has not been set, the bootloader process loads an image stored in the non-volatile memory into volatile memory of the subsystem. The image corresponds to processes properly running on the SMP subsystem after the SMP subsystem has booted, including a management process. The processes begin executing on the subsystem. The management process, determines whether a hardware configuration change within the subsystem has been made since when the image was saved to the non-volatile memory. In response to determining that the hardware configuration change has been made, the management process sets the flag and rebooting the subsystem.

20 Claims, 4 Drawing Sheets

RAPID ACTIVATION OF SERVICE MANAGEMENT PROCESSOR SUBSYSTEM FOR SERVER DEVICE

FIELD OF THE INVENTION

The present invention relates generally to a service management processor (SMP) subsystem for a server device, and more particularly to rapidly activating the SMP subsystem.

BACKGROUND OF THE INVENTION

Server devices are computing devices that typically provide computing-related services to a number of client computing devices. For example, a web server device may host a web site, which is accessible over the Internet by client computing devices running web browsing computer programs. As another example, a database server device manages a database, and receives queries from client computing devices to retrieve, update, and/or add data within the database.

Server devices may have to have high levels of reliability and uptime. As such, some server devices include associated service management processor (SMP) subsystems. An SMP subsystem is basically a computing device that is separate from a server device, but which interacts with the server device at a low level to permit remote management of the server device. The SMP subsystem may constantly monitor its associated server device to ensure that the server device is running properly.

A network administrator or other user may receive alerts from the SMP subsystem if the server device is not running properly. The SMP subsystem may permit the administrator to remotely manage the server device. For example, the administrator may be able to remotely start and terminate processes running on the server device, through the SMP subsystem. The administrator may further be able to reboot the server device, through the SMP subsystem, without having to be present at the physical location of the server device.

SUMMARY OF THE INVENTION

A method of an embodiment of the invention includes determining, by a bootloader process executing on a service management processor (SMP) subsystem for a server device, whether an initialization flag stored within non-volatile memory of the SMP subsystem is set. The initialization flag corresponds to whether a full cold initialization process of the SMP subsystem is to occur. In response to determining that the initialization flag has not been set, the bootloader process loads an image stored in the non-volatile memory into volatile memory of the SMP subsystem. The image corresponding to processes properly running on the SMP subsystem after the SMP subsystem has booted, including a management process. The processes begin executing on the SMP subsystem. The management process determines whether a hardware configuration change within the SMP subsystem has been made since when the image was saved to the non-volatile memory. In response to determining that the hardware configuration change has been made, the management process sets the initialization flag and rebooting the SMP subsystem.

An SMP subsystem of an embodiment of the invention is for a server device, and includes an SMP, non-volatile memory, volatile memory, a bootloader process, and a management process. The non-volatile memory is to store an initialization flag corresponding to whether a full cold initialization process of the SMP subsystem is to occur. The non-volatile memory is further to store an image corresponding to processes properly running on the SMP subsystem after the SMP subsystem has booted. The bootloader process is executed by the SMP from the volatile memory to, in response to determining that the initialization flag has not been set, load the image into the volatile memory such that the SMP begins executing the processes. The management process is executed by the SMP from the volatile memory as a result of the bootloader process loading the image into the volatile memory, where the management process is one of the processes of the image. The management process is to, in response to determining that a hardware configuration change has been made since when the image was saved to the non-volatile memory, set the initialization flag and reboot the SMP subsystem.

A system of an embodiment of the invention includes a server device and an SMP subsystem for the server device. The SMP subsystem is to boot the server device and to permit remote management of the server device. The SMP subsystem includes an SMP, non-volatile memory, volatile memory, a bootloader process, and a management process. The non-volatile memory is to store an initialization flag corresponding to whether a full cold initialization process of the SMP subsystem is to occur. The non-volatile memory is further to store an image corresponding to processes properly running on the SMP subsystem after the SMP subsystem has booted. The bootloader process is executed by the SMP from the volatile memory to, in response to determining that the initialization flag has not been set, load the image into the volatile memory such that the SMP begins executing the processes. The management process is executed by the SMP from the volatile memory as a result of the bootloader process loading the image into the volatile memory, where the management process is one of the processes of the image. The management process is to, in response to determining that a hardware configuration change has been made since when the image was saved to the non-volatile memory, set the initialization flag and reboot the SMP subsystem.

A computer program product of an embodiment of the invention includes a computer-readable storage medium having computer-readable code embodied therein. The computer-readable code is executable on an SMP subsystem for a server device. The SMP subsystem includes an SMP, non-volatile memory, and volatile memory. The computer-readable code includes first computer-readable code encompassing a bootloader process, and second computer-readable code encompassing a management process. The bootloader process is to, in response to determining that an initialization flag stored in the non-volatile memory corresponding to whether a full cold initialization process of the SMP subsystem is to occur has not been set, load an image from the non-volatile memory to the volatile memory. The image corresponding to processes properly running on the SMP subsystem after the SMP subsystem has booted. The SMP begins executing the processes. The management process is one of the processes of the image, and is executed by the SMP from the volatile memory as a result of the bootloader process loading the image into the volatile memory. The management process is to, in response to determining that a hardware configuration change has been made since when the image was saved to the non-volatile memory, set the initialization flag and reboot the SMP subsystem.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

DETAILED DESCRIPTION

Figure 1:
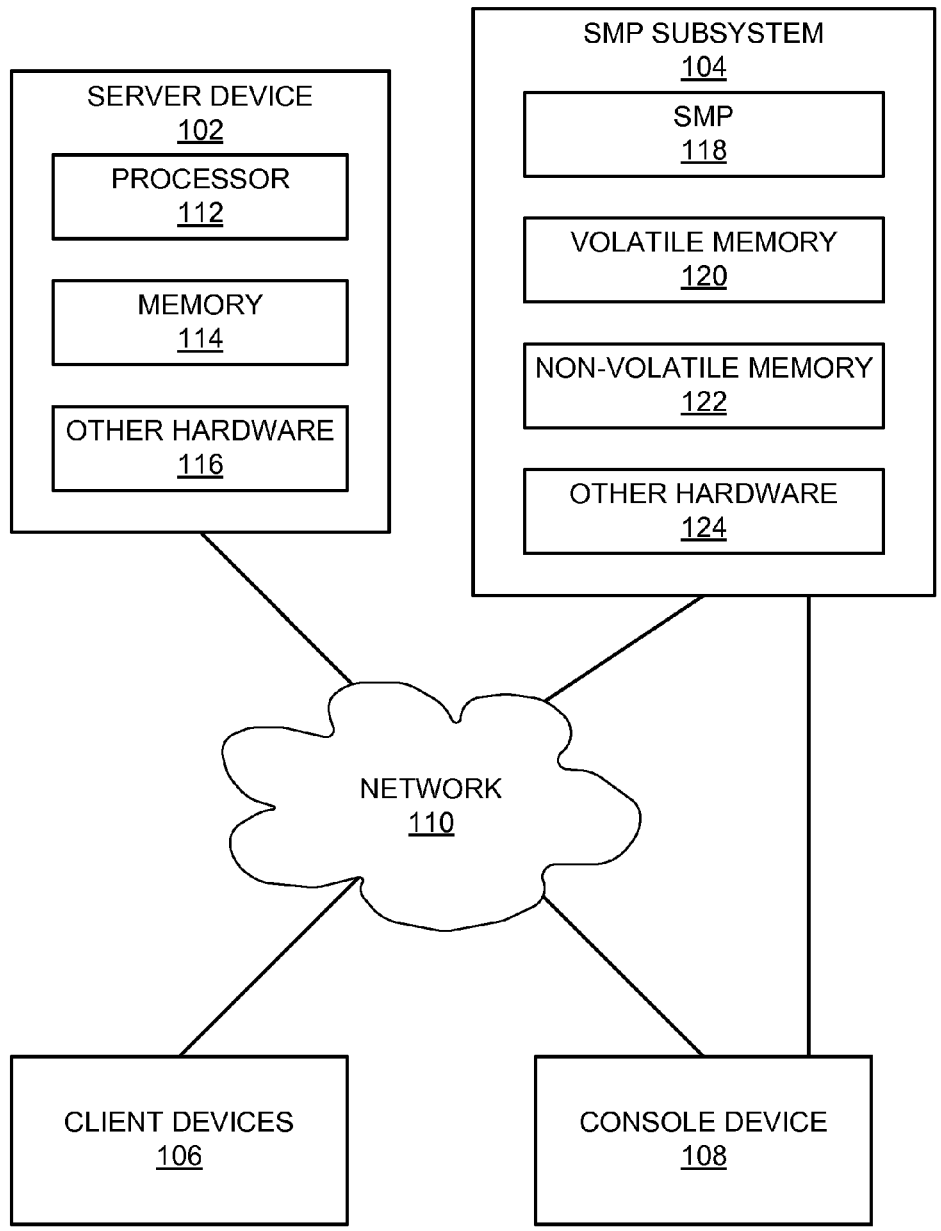
FIG. 1 is a diagram of a system including a server device and a service management processor (SMP) subsystem for the server device, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a service management processor (SMP) subsystem is basically a computing device that is separate from a server device, but which interacts with the server device at a low level to permit remote management of the server device. To boot the server device, the SMP subsystem is first booted. Once the SMP subsystem has been booted and is executing properly, the SMP subsystem may automatically or responsive to user direction boot the server device.

As SMP subsystems have become more sophisticated, the length of time it takes to boot an SMP subsystem has increased considerably. It is not uncommon for an SMP subsystem to take ten-to-fifteen minutes, if not longer, to completely boot. This means that to boot a server device, a network administrator or other user first has to wait a considerably long period of time for the SMP subsystem to boot, before the server device with which the SMP subsystem is associated even begins to boot.

To reduce this length of time, existing approaches have attempted to optimize the full initialization process of the SMP subsystem, which is the process to boot the SMP subsystem from when it is first turned on until the SMP subsystem is functioning properly and ready to boot the server process. Some techniques have focused on attempting to perform various parts of the full initialization process at different times, so at least some functionality of the SMP subsystem is ready for use more quickly. Other techniques have focused on attempting to use multiple concurrently executed threads to speed the full initialization process of the SMP subsystem.

However, these attempts have only reached varying degrees of success. Ultimately, as SMP subsystems have increased in sophistication, the length of time to perform the full initialization process has increased. Existing optimization approaches may have decreased the rate at which this length of time is increasing, and in some instances may have decreased this length of time by a small percentage. However, even in light of these optimization approaches, the length of time it takes to boot SMP subsystems remains undesirably lengthy.

The inventors have recognized that the SMP subsystems are generally closed environments, in which the same computer-executable code is run on the SMP subsystems for different versions of the same server devices. When hardware of an SMP subsystem fails, it is typically replaced with the same hardware, and not with new hardware that may require different drivers or initialization processes. That is, unlike a server device, an SMP subsystem for a server device does not typically have its hardware upgraded, since the functionality of an SMP subsystem is relatively specialized and since an SMP has to have higher reliability than its associated server device.

Embodiments of the invention leverage these properties of SMP subsystems to greatly decrease the length of time it typically takes to boot an SMP subsystem. In particular, the image corresponding to processes properly running on the SMP subsystem after the SMP subsystem has booted is captured and stored in non-volatile memory of the SMP subsystem. When the SMP subsystem is booted, the image can be retrieved from non-volatile memory to in essence continue execution of these processes from the point in time when the image was captured, in lieu of performing a full cold initialization process, which is the complete boot process of the SMP subsystem, and which can take a lengthy time to perform.

As such, the length of time it typically takes to boot an SMP subsystem is considerably reduced. As noted above, a representative SMP subsystem may take on the order of ten-to-fifteen minutes to completely boot. By comparison, such an SMP subsystem being booted in accordance with embodiments of the invention may only require one minute at most to boot. As such, SMP subsystem boot time is reduced by about 90-95%.

It is further noted that embodiments of the invention are complementary to, and do not replace or are replaced by, existing optimization techniques to reduce the boot time of an SMP subsystem. That is, existing optimization techniques focus on reducing the full cold initialization process of an SMP subsystem. By comparison, embodiments of the invention in most cases sidestep the full cold initialization process completely, and instead in essence perform a warm boot of an SMP subsystem by retrieving an image of processes properly running on the SMP subsystem after the SMP subsystem has booted, from non-volatile memory. In the small minority of cases where the full cold initialization process still has to be performed, however, existing optimization techniques can still be employed.

FIG. 1 shows a system 100, according to an embodiment of the invention. The system 100 includes a server device 102, an SMP subsystem 104 for the server device 102, a number of client devices 106, and a representative console device 108. The devices 102, 106, and 108, and the SMP subsystem 104, are communicatively interconnected via a network 110. The network 110 may be or include the Internet, intranets, extranets, wireless networks, wired networks, local-area networks, wide-area networks, telephone networks, and/or other types of networks.

The SMP subsystem 104 is directly connected to the server device 102, and in one embodiment may be located within the same case or chassis as the server device 102 is. As noted above, the SMP subsystem 104 monitors the server device 102, and permits remote management of the server device 102. By comparison, the client devices 106 are connected to the server device 102 indirectly, via the network 110. The console device 108 may be indirectly connected to the SMP subsystem 104 via the network 110, and/or directly connected to the SMP subsystem 104.

The console device 108 is the local device of the network administrator or other user at which the administrator provides input to the SMP subsystem 104, and at which the administrator receives output from the SMP subsystem 104. The console device 108 may be one of the client devices 106, such as a computing device like a desktop computer or a laptop computer, and which may perform tasks other than management of the server device 102 through the SMP subsystem 104. Alternatively, the console device 108 may be dedicated to performing management of the server device 102, and may be a dumb terminal in one embodiment.

The server device 102 includes a processor 112, memory 114, and other hardware 116 to perform its corresponding functionality. For example, where the server device 102 is a web server device, the processor 112, the memory 114, and the other hardware 116 may interact with one another, as instructed by one or more computer programs, to host a web site. As another example, where the server device 102 is a database server device, the processor 112, the memory 114, and the other hardware 116 may interact with one another, as instructed by one or more computer programs, to maintain a database.

The SMP subsystem 104 includes an SMP 118, volatile memory 120, non-volatile memory 122, and other hardware 124. It is not that the SMP 118 is not one of the processors of the server device 102 such as the processor 112. For example, the SMP 118 is not considered a central processing unit (CPU) of the server device 102, but rather is a dedicated processor solely for and of the SMP subsystem 104. Likewise, the volatile memory 120 and the non-volatile memory 122 are not part of the memory 114 of the server device 102, and thus are not shared with the server device 102, but rather are solely for and of the SMP subsystem 104. The same is true for the other hardware 124 vis-à-vis the other hardware 116 of the server device 102.

Figure 2:
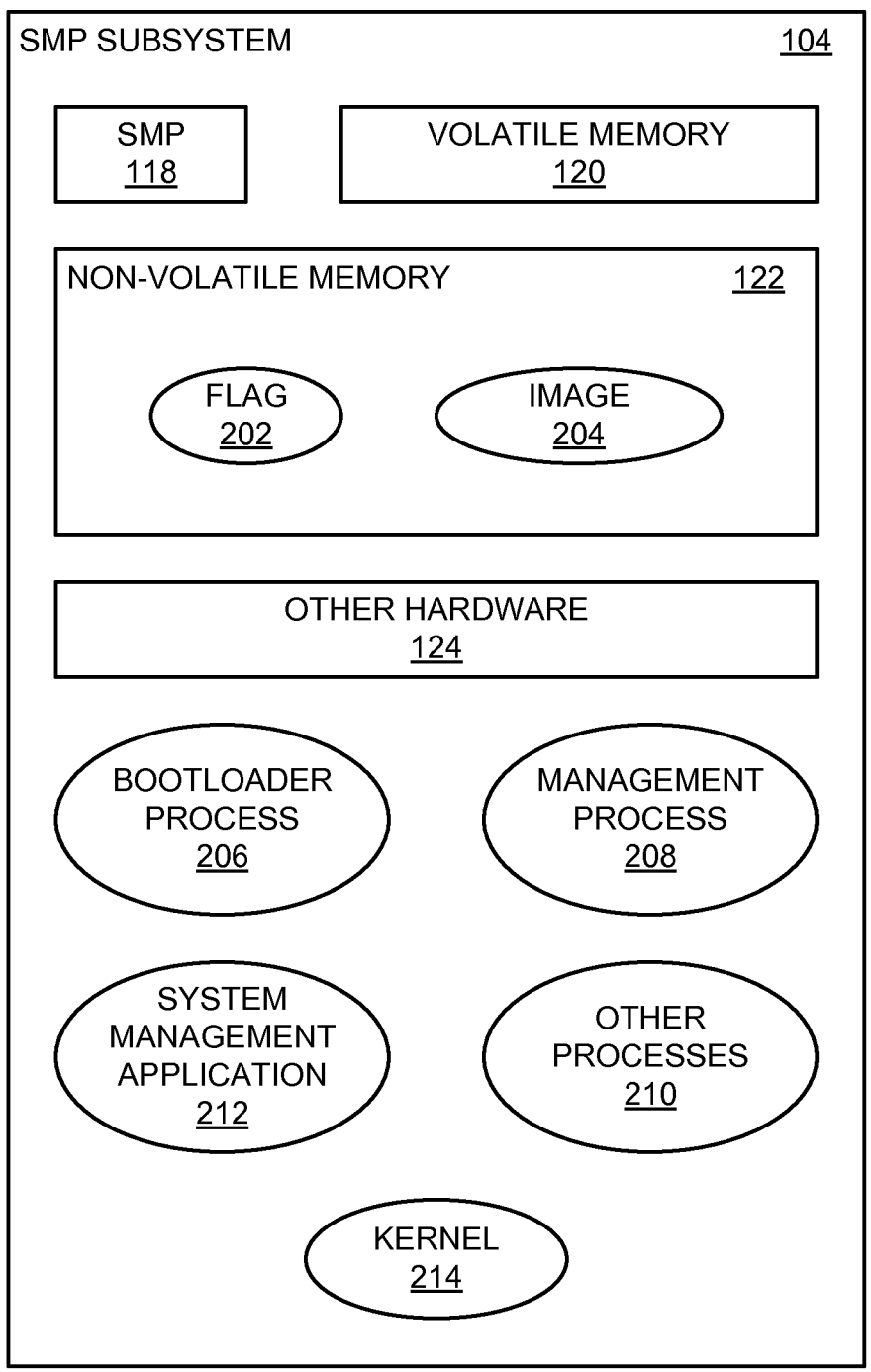
FIG. 2 is a diagram of an SMP subsystem for a server device, according to an embodiment of the invention.

FIG. 2 shows the SMP subsystem 104 in more detail, according to an embodiment of the invention. As in FIG. 1, the SMP subsystem 104 in FIG. 2 includes the SMP 118, the volatile memory 120, the non-volatile memory 122, and the other hardware 124. Furthermore, the non-volatile memory 122 stores an initialization flag 202 and an image 204. The SMP subsystem 104 also includes a bootloader process 206, a management process 208, other processes 210, a system management application 212, and a kernel 214. The processes 206, 208, and 210, the application 212, and the kernel 214, are each executed by the SMP 118 from the volatile memory 120, and as such are said to be executed on and by the SMP subsystem 104.

The initialization flag 202 indicates and corresponds to whether a full cold initialization process of the SMP subsystem 104 is to occur when power is applied to the SMP subsystem 104 after power has been removed from the subsystem 104. For example, if the initialization flag 202 is set, then the full cold initialization process of the SMP subsystem 104 is to be performed. By comparison, if the initialization flag 202 is cleared, then the full cold initialization process is not performed, and instead a warm boot of the SMP subsystem 104 is performed utilizing the image 204.

The image 204 stores and corresponds to processes in a state where the processes are properly running on the SMP subsystem 104 after the SMP subsystem 104 has booted. For instance, the image may have been captured after the SMP subsystem 104 has been booted and when the processes are in a state where they are properly running on the subsystem 104, prior to power having been removed from the SMP subsystem 104. These processes include the management process 208 and the other processes 210. As such, the image 204 can effectively be considered as a snapshot of the contents of the volatile memory 120 of the SMP subsystem 104 when the processes were in a properly executing state.

In one embodiment, the image 204 initially preloaded on the SMP subsystem 104 is not a snapshot of the contents of the volatile memory 120 of the SMP subsystem 104 per se, but rather of a general class of SMP subsystems including the SMP subsystem 104. In this embodiment, the class of SMP subsystems may be for different versions of the same type of server device, such as the server device 102. The image 204 thus may have been created before the SMP subsystem 104 was ever booted even once, and preloaded onto the non-volatile memory 122 of the subsystem 104. The initialization flag 202 can therefore be cleared to cause a warm boot of the SMP subsystem 104 using the image 204 the first time power is applied to the subsystem 104.

The bootloader process 206 is the initial process that is run when power is applied to the SMP subsystem 104, and is responsible for ensuring that other processes are ultimately started so that the subsystem 104 is properly initialized. These other processes include the management process 208 and the other processes 210. In this respect, what is referred to as the management process 208 is a process that performs particular functionality in relation to embodiments of the invention, as is described in detail later in the detailed description.

The system management application 212 is an application program that permits network administrators and other users to use the SMP subsystem 104 to remotely manage the server device 102. The system management application 212 is loaded after the processes 206, 208, and 210, and the kernel 214, have been loaded and started. The kernel 214 is the core of the operating system of the SMP subsystem 104, and manages the hardware resources of the SMP subsystem 104 for utilization by the processes 206, 208, and 210, and the application 212.

Figure 3:
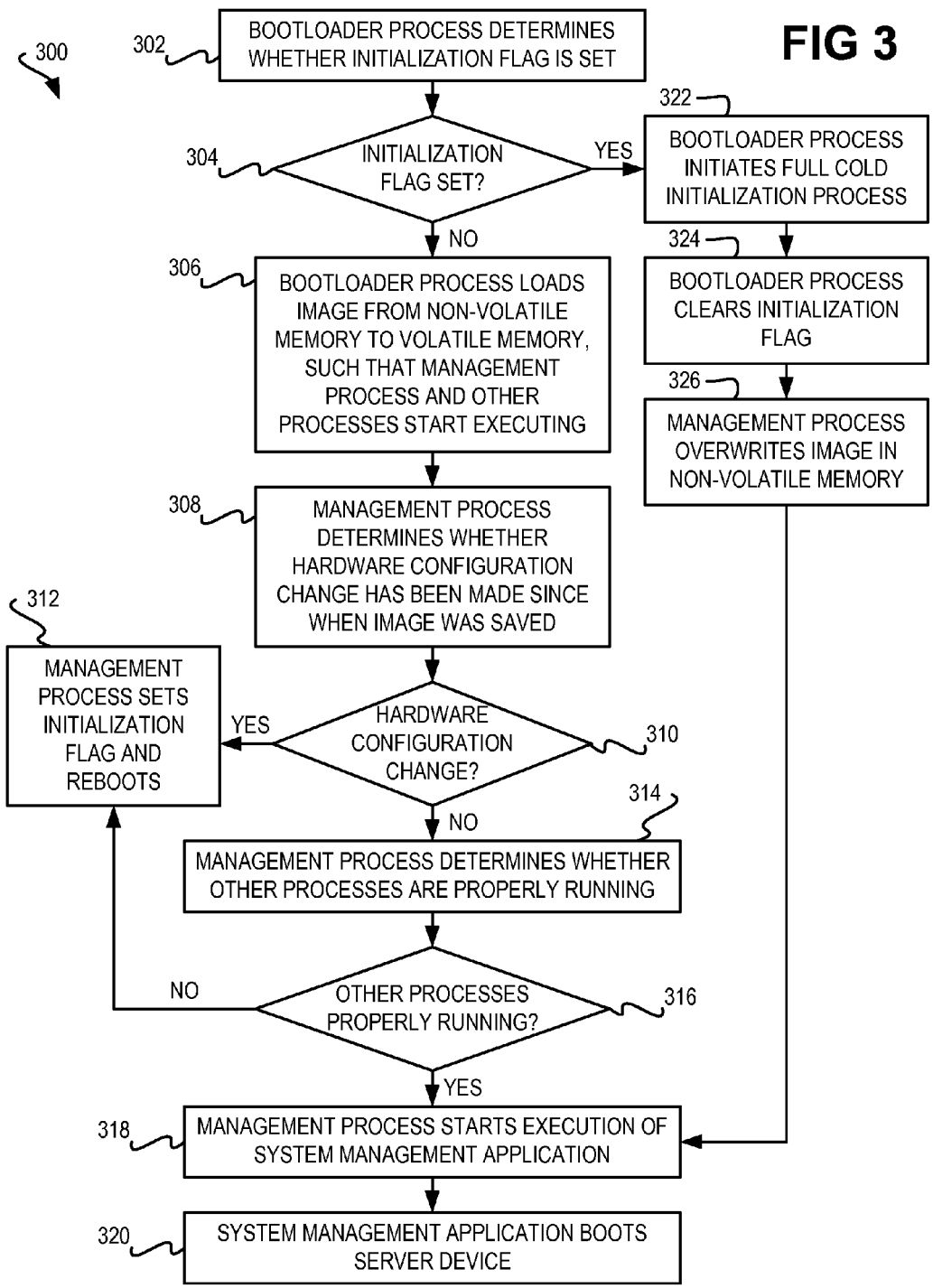
FIG. 3 is a flowchart of a method for rapid activation of an SMP subsystem for a server device, according to another embodiment of the invention.

FIG. 3 shows a method 300 of the boot process of the SMP subsystem 104, according to an embodiment of the invention. The method 300 is performed after power has been removed from the SMP subsystem 104, and subsequently reapplied to the SMP subsystem 104. Reapplying power to the SMP subsystem 104 causes the bootloader process 206 to be executed as the first process, or one of the first processes, to run on the SMP subsystem 104. The method 300 is also performed when the SMP subsystem 104 is rebooted.

The bootloader process 206 determines whether the initialization flag 202 has been set (304). If the initialization flag 202 has been cleared (i.e., is not set) (304), then the bootloader process 206 loads the image 204 from the non-volatile memory 122 to the volatile memory 120 (306). As such, the management process 208 and the other processes 210 that are part of the image 204 begin executing on the SMP subsystem 104 from the state in which they were previously being executed when the image 204 was made and stored on the non-volatile memory 122.

The management process 212 determines whether a hardware configuration change has been made to the SMP subsystem 104 relative to when the image 204 was saved to the non-volatile memory 122 (308). Stated another way, the image 204 presumes a certain hardware configuration of the SMP subsystem 104. If the current and actual hardware configuration of the SMP subsystem 104 is different than the hardware configuration presumed by the image 204, then it is said that a hardware configuration change has been made to the SMP subsystem 104. A hardware configuration change can result from completely new hardware being installed within the SMP subsystem 104, or from existing hardware being configured in a different way.

If a hardware configuration change has been made (310), then the full cold initialization process has to be performed. Therefore, the management process 212 sets the initialization flag 202 and reboots the SMP subsystem 104 (312). As such, the method 300 is repeated at part 302.

However, if a hardware configuration has not been made (310), then the management process determines whether the other processes 210 that are part of the image 204 are properly running (314). As noted above, the other processes 210 begin executing on the SMP subsystem 104 when the image 204 is loaded from the non-volatile memory 122 to the volatile memory 120, from a state in which they were previously being executed when the image 204 was created. If for some reason one or more of these other processes 210 did not properly continue execution from this state, such that they are not properly running (316), then the full cold initialization process has to be performed. Therefore, the management process 212 sets the initialization flag 202 and reboots the SMP subsystem 104 (312), causing the method 300 to be repeated at part 302.

However, if the other processes 210 are properly running (316), then the management process starts execution of the system management application 212 (318). The system management application 212 is the computer program that interfaces with the server device 102. As such, the system management application 212 boots the server device 102 (320).

In this way, then, where the initialization flag is not set in part 304, where no hardware configuration change has occurred in part 310, and where the other processes 210 are properly running in part 316, the boot process of FIG. 3 of the SMP subsystem 104 does not result in a full cold initialization process being performed. The bootloader process 206 loads the image 204 from the non-volatile memory 122 to the volatile memory 120, which results in the management process 208 being executed and determining whether there has been a hardware configuration change and whether the other processes 210 are properly running. Assuming no such hardware configuration change and assuming the proper running of the other processes 210, the management process 208 starts execution of the system management application 212, to cause the server device 102 to be booted.

However, if the initialization flag has been set in part 312, then when the method 300 is repeated, the method 300 proceeds from part 304 to part 322. The bootloader process 206 initiates the full cold initialization process of the SMP subsystem 104 (322), an embodiment of which is described later in the detailed description. Once this full cold initialization process has been at least partially completed, the bootloader process 206 clears the initialization flag (324). Furthermore, the management process 208 overwrites the image 204 stored within the non-volatile memory 122 with a new version that reflects the current state of the other processes 210, as properly running on the SMP subsystem 104.

Therefore, the next time the SMP subsystem 104 is booted by performing the method 300, the full cold initialization process is not likely to have to be performed. The initialization flag 202 has been cleared, so the method 300 proceeds from part 304 to part 306, instead of to part 322 at which the full cold initialization process is initiated. The full cold initialization process is typically performed in one of just two cases. First, the full cold initialization process is performed when a hardware configuration change occurred. Second, the full cold initialization process is performed when the other processes 210 are not properly running after the image 204 has been loaded from the non-volatile memory 122 to the volatile memory 120.

In the first case where a hardware configuration change resulted in the full cold initialization process having been performed in a prior iteration of the method 300, the new version of the image 204 stored within the non-volatile memory 122 now reflects the updated hardware configuration. As such, the method 300 proceeds from part 310 to part 314 in the next iteration of the method 300, instead of to part 312 at which the full cold initialization process is initiated. Similarly, in the second case where the other processes 210 were not properly running resulted in the full cold initialization process having been performed in the prior iteration of the method 300, the new version of the image 204 stored within the non-volatile memory 122 should correct this problem. As such, the method 300 proceeds from part 316 to part 318 in the next iteration of the method 300, instead of to part 312 at which the full cold initialization process is initiated.

Figure 4:
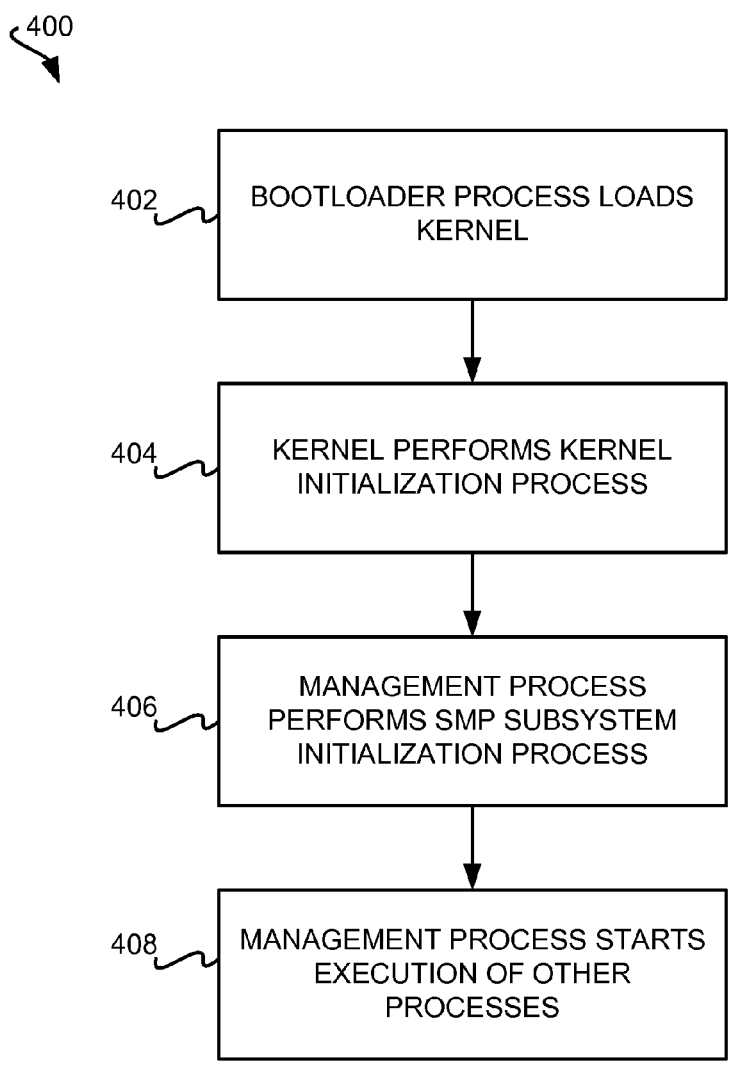
FIG. 4 is a flowchart of a method for a full cold initialization process of an SMP subsystem for a server device, according to an embodiment of the invention.

FIG. 4 shows a method 400 of the full cold initialization process of the SMP subsystem 104, according to an embodiment of the invention. The bootloader process loads the kernel 214 from the non-volatile memory 122 to the volatile memory 120 (402), causing the kernel 214 to begin executing on the SMP subsystem 104. The kernel 214 in turn performs a kernel initialization process (404). The kernel initialization process includes establishing a communication path between the hardware of the SMP subsystem 104 and the software of the subsystem 104, among other tasks.

The management process 208 begins executing as a result of the of the kernel initialization process having been performed. The management process 208 performs an SMP subsystem initialization process (406). The SMP subsystem initialization process includes running scripts to start any necessary kernel services, among other tasks. As part of the SMP subsystem initialization process, or as a separate task, the management process 208 also starts execution of the other processes 210 (408).

The boot process of the SMP subsystem 104 that has been described thus permits rapid activation of the SMP subsystem 104 when the full cold initialization process does not have to be performed. It is noted that this rapid activation of the SMP subsystem 104 differs from the hibernation of computing devices as is conventionally found within the prior art, in a number of ways. In hibernation, the currently running state of a computing device is saved to non-volatile memory when a user decides to shut down the computing device. When the user turns on the computing device the next time, the computing device loads the previously running state from the non-volatile memory, so that the user can continue where he or she left off.

One way in which the rapid activation of the SMP subsystem 104 differs from such hibernation is when the image 204 of the currently running state is saved to the non-volatile memory 122. In embodiments of the invention, the image 204 may be saved to the non-volatile memory 122 before the SMP subsystem 104 has been booted for even the first time, as described above, which is not possible with conventional hibernation. The image 204 alternatively is saved to the non-volatile memory 122 automatically at the conclusion of the full cold initialization process, as described above, as opposed to when a user non-automatically initiates shut down of the computing device, as in hibernation.

Furthermore, hibernation is applicable to computing devices like the server device 102, not to SMP subsystems for such computing devices, like the SMP subsystem 104. Hibernation, in other words, involves saving the state of a computing device like the server device 102 so that the next time a user turns the computing device on, booting is performed more quickly. By comparison, the rapid activation of embodiments of the invention does not pertain to saving the state of a computing device like the server device 102, but rather pertains to saving the state for an SMP subsystem like the SMP subsystem 104 that is used to manage such a computing device.

That is, an SMP subsystem like the SMP subsystem 104 does not have utility apart from the server device with which it is associated. This is unlike a computing device such as a server device, which has utility even if the device is not associated with an SMP subsystem. Stated another way, if there is no server device, then there is no purpose for or reason in having an SMP subsystem. By comparison, if there is no SMP subsystem, a computing device like a server device still has purpose and reason for being—the device will just not be able to be managed as effectively as when the device has an associated SMP subsystem.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   determining, by a bootloader process executing on a service management processor (SMP) subsystem for a server device, subsequent to the SMP subsystem having replaced a faulty SMP subsystem for the server device, the SMP subsystem having same hardware as the faulty SMP subsystem, the SMP subsystem having never been previously booted, whether an initialization flag stored within non-volatile memory of the SMP subsystem is set, the initialization flag corresponding to whether a full cold initialization process of the SMP subsystem is to occur;
   in response to determining that the initialization flag has not been set;
      loading, by the bootloader process, an image stored in the non-volatile memory into volatile memory of the SMP subsystem, the image corresponding to processes properly running on the SMP subsystem after the SMP subsystem has booted, including a management process, such that the processes begin executing on the SMP subsystem, the image preloaded into the SMP subsystem, the image corresponding to processes previously running on the faulty SMP subsystem for the server device prior to failure of the faulty SMP subsystem;
      determining, by the management process, whether a hardware configuration change within the SMP subsystem has been made; and,
      in response to determining that the hardware configuration change has been made, setting the initialization flag and rebooting the SMP subsystem, by the management process,
   wherein the SMP subsystem is warm booted a first time power is applied to the SMP subsystem without ever having been cold booted such that the SMP subsystem runs the processes previously running on the faulty SMP subsystem prior to the SMP subsystem having replaced the faulty SMP subsystem.

2. The method of claim 1, further comprising, in response to determining that the initialization flag has not been set, and in response to determining that the hardware configuration change has not been made:
   determining, by the management process, whether other processes loaded from the image that are now executing on the SMP subsystem are properly running; and,
   in response to determining that the other processes are not properly running,
      setting the initialization flag and rebooting the SMP subsystem, by the management process.

3. The method of claim 2, further comprising, in response to determining that the initialization flag has not been set, and in response to determining that the hardware configuration change has not been made:
   in response to determining that the other processes are properly running,
      starting execution of a system management application on the SMP subsystem, by the management process.

4. The method of claim 3, further comprising, in response to determining that the initialization flag has not been set, in response to determining that the hardware configuration change has not been made, and in response to determining that the other processes are properly running:
   booting the server device, by the system management application.

5. The method of claim 1, further comprising, in response to determining that the initialization flag has been set:
   initiating the full cold initialization process of the SMP subsystem, by the bootloader process;
   clearing the initialization flag, by the bootloader process;
   overwriting the image in the non-volatile memory with a new version of the image, by the management process.

6. The method of claim 5, wherein the full cold initialization process of the SMP subsystem comprises:
   loading a kernel, by the bootloader process, within the volatile memory of the SMP subsystem, such that the kernel begins executing on the SMP subsystem;
   performing a kernel initialization process, by the kernel;
   performing an SMP subsystem initialization process, by the management process that begins executing on the SMP subsystem as a result of the kernel initialization process having been performed; and,
   starting execution of other processes on the SMP subsystem, by the management process.

7. The method of claim 5, further comprising, in response to determining that the initialization flag has been set:
   starting execution of a system management application on the SMP subsystem, by the management process.

8. A service management processor (SMP) subsystem for a server device, comprising:
   an SMP;
   non-volatile memory to store an initialization flag corresponding to whether a full cold initialization process of the SMP subsystem is to occur, and to store an image corresponding to processes previously running on a faulty SMP subsystem for the server device prior to failure of the faulty SMP subsystem and that the SMP subsystem has replaced, the SMP subsystem having same hardware as the faulty SMP subsystem;
   volatile memory;
   a bootloader process executed by the SMP from the volatile memory to, in response to determining that the initialization flag has not been set, load the image into the volatile memory, the image being preloaded into the non-volatile memory; and,
   a management process executed by the SMP from the volatile memory as a result of the bootloader process loading the image into the volatile memory, the management process being one of the processes of the image,
   wherein the management process is to, in response to determining that a hardware configuration change has been made, set the initialization flag and reboot the SMP subsystem, and wherein the SMP subsystem is warm booted a first time power is applied to the SMP subsystem without ever having been cold booted such that the SMP subsystem runs the processes previously running on the faulty SMP subsystem prior to the SMP subsystem having replaced the faulty SMP subsystem.

9. The SMP subsystem of claim 8, wherein the management process is further to, in response to determining that the hardware configuration change has not been made and in response to determining that other processes loaded from the image that are now executing on the SMP subsystem are not properly running, set the initialization flag and reboot the SMP subsystem.

10. The SMP subsystem of claim 8, wherein the management process is further to, in response to determining that the hardware configuration change has not been made and in response to determining that other processes loaded from the image that are now executing on the SMP subsystem are properly running, start execution of a system management application by the SMP.

11. The SMP subsystem of claim 10, wherein the system management application is to boot the server device upon being executed by the SMP.

12. The SMP subsystem of claim 8, wherein the bootloader process is to, in response to determining that the initialization flag has not been set, initiate the full cold initialization process of the SMP subsystem and clear the initialization flag.

13. A system comprising:
a server device; and,
a service management processor (SMP) subsystem for the server device to boot the server device and to permit remote management of the server device, the SMP subsystem comprising:
an SMP;
non-volatile memory to store an initialization flag corresponding to whether a full cold initialization process of the SMP subsystem is to occur, and to store an image corresponding to processes previously running on a faulty SMP subsystem for the server device prior to failure of the faulty SMP subsystem and that the SMP subsystem has replaced, the SMP subsystem having same hardware as the faulty SMP subsystem;
volatile memory;
a bootloader process executed by the SMP from the volatile memory to, in response to determining that the initialization flag has not been set, load the image into the volatile memory, the image being preloaded into the non-volatile memory; and,
a management process executed by the SMP from the volatile memory as a result of the bootloader process loading the image into the volatile memory, the management process being one of the processes of the image,
wherein the management process is to, in response to determining that a hardware configuration change has been made, set the initialization flag and reboot the SMP subsystem,
and wherein the SMP subsystem is warm booted a first time power is applied to the SMP subsystem without ever having been cold booted such that the SMP subsystem runs the processes previously running on the faulty SMP subsystem prior to the SMP subsystem having replaced the faulty SMP subsystem.

14. The system of claim 13, wherein the management process is further to, in response to determining that the hardware configuration change has not been made and in response to determining that other processes loaded from the image that are now executing on the SMP subsystem are not properly running, set the initialization flag and reboot the SMP subsystem.

15. The system of claim 13, wherein the management process is further to, in response to determining that the hardware configuration change has not been made and in response to determining that other processes loaded from the image that are now executing on the SMP subsystem are properly running, start execution of a system management application by the SMP.

16. The system of claim 15, wherein the system management application is to boot the server device upon being executed by the SMP.

17. The system of claim 13, wherein the bootloader process is to, in response to determining that the initialization flag has not been set, initiate the full cold initialization process of the SMP subsystem and clear the initialization flag.

18. A computer program product comprising:
a storage device having computer-readable code embodied therein, the computer-readable code executable on a service management processor (SMP) subsystem for a server device, the SMP subsystem comprising an SMP that has not ever been previously booted, non-volatile memory, and volatile memory, the computer-readable code comprising:
first computer-readable code encompassing a bootloader process to, in response to determining that an initialization flag stored in the non-volatile memory corresponding to whether a full cold initialization process of the SMP subsystem is to occur has not been set, load an image the image corresponding to previously running on a faulty SMP subsystem for the server device prior to failure of the fault SMP subs stem and that the SMP subs stem has replaced, the SMP subsystem having same hardware as the faulty SMP subsystem, the image being preloaded into the SMP subsystem, from the non-volatile memory to the volatile memory, such that the SMP begins executing the processes and such that a first time power is applied to the SMP subsystem; and
second computer-readable code encompassing a management process executed by the SMP from the volatile memory as a result of the bootloader process loading the image into the volatile memory, the management process being one of the processes of the image,
wherein the management process is to, in response to determining that a hardware configuration change has been made since when the image was saved to the non-volatile memory, set the initialization flag and reboot the SMP subsystem,
and wherein the SMP subsystem is warm booted a first time power is applied to the SMP subsystem without ever having been cold booted such that the SMP subsystem runs the processes previously running on the faulty SMP subsystem prior to the SMP subsystem having replaced the faulty SMP subsystem.

19. The computer program product of claim 18, wherein the management process is further to, in response to determining that the hardware configuration change has not been made:
in response to determining that other processes loaded from the image that are now executing on the SMP subsystem are not properly running, set the initialization flag and reboot the SMP subsystem; and,
in response to determining that other processes loaded from the image that are now executing on the SMP subsystem are properly running, start execution of a system management application by the SMP, the system management application to boot the server device upon being executed by the SMP.

20. The computer program product of claim 18, wherein the bootloader process is to, in response to determining that the initialization flag has not been set, initiate the full cold initialization process of the SMP subsystem and clear the initialization flag.

* * * * *